April 15, 1969     A. J. BURNISKI ET AL     3,438,415
FRENCH PURSE
Filed Jan. 11, 1967     Sheet 1 of 5
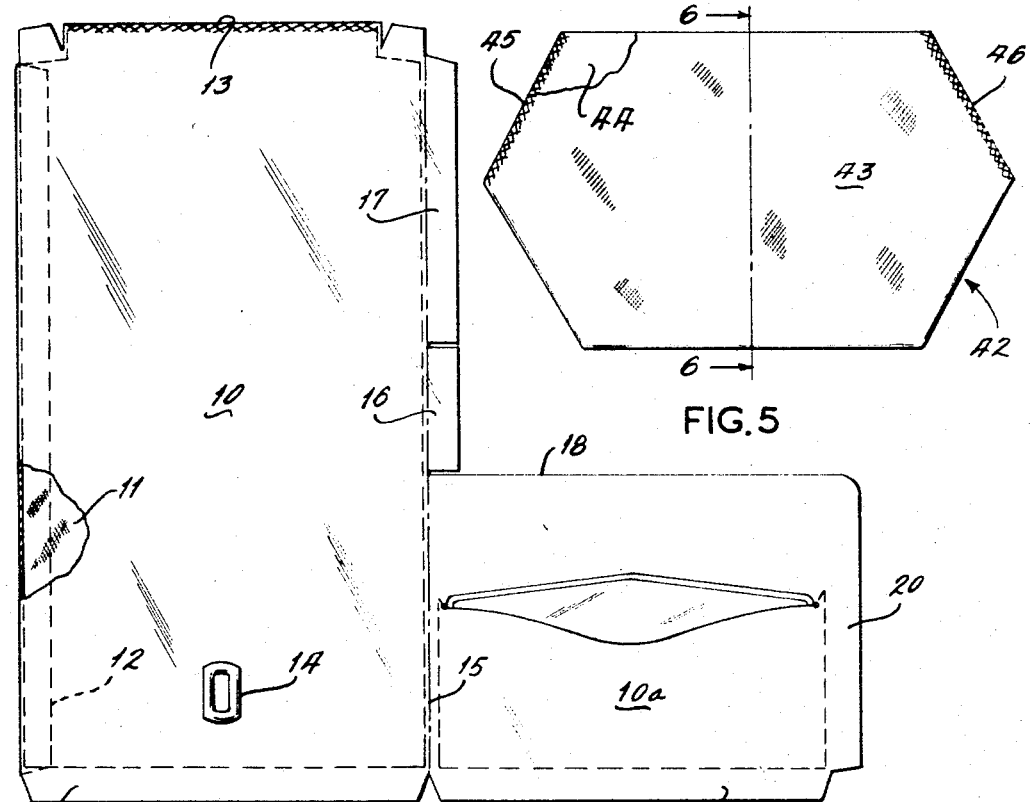
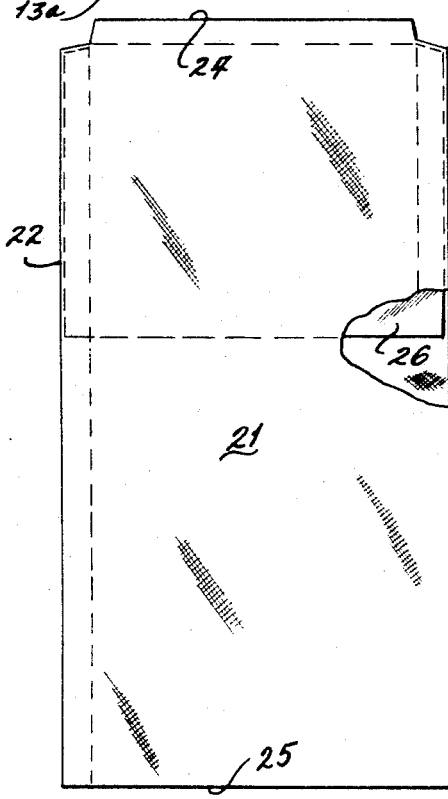
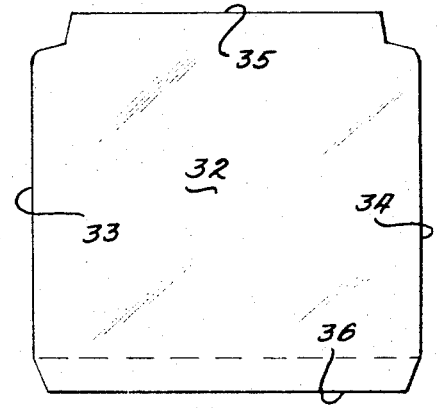
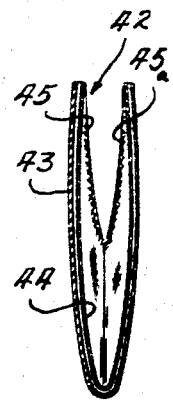
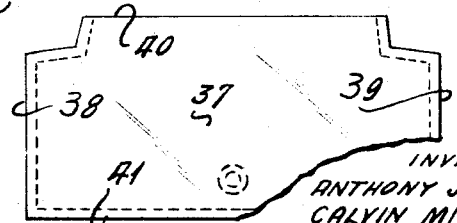
INVENTORS:
ANTHONY J. BURNISKI
CALVIN MITCHELL
BY Gravely Lieder & Woodruff
ATTORNEYS.

INVENTORS.
ANTHONY J. BURNISKI
CALVIN MITCHELL
BY Gravely Lieder & Woodruff
ATTORNEYS.

April 15, 1969 A. J. BURNISKI ET AL 3,438,415
FRENCH PURSE
Filed Jan. 11, 1967 Sheet 3 of 5

INVENTORS:
ANTHONY J. BURNISKI
CALVIN MITCHELL
BY Gravely Lieder & Woodruff
ATTORNEYS.

April 15, 1969   A. J. BURNISKI ET AL   3,438,415

FRENCH PURSE

Filed Jan. 11, 1967   Sheet 5 of 5

INVENTORS:
ANTHONY J. BURNISKI
CALVIN MITCHELL
BY Gravely Lieder & Woodruff
ATTORNEYS.

United States Patent Office 3,438,415
Patented Apr. 15, 1969

3,438,415
FRENCH PURSE
Anthony J. Burniski, Warson Woods, and Calvin Mitchell, St. Louis County, Mo., assignors to Prince Gardner Company, Inc., St. Louis, Mo., a corporation of New York
Filed Jan. 11, 1967, Ser. No. 608,642
Int. Cl. A45c 1/06, 15/00
U.S. Cl. 150—35       15 Claims

ABSTRACT OF THE DISCLOSURE

A combination billfold and purse or French purse having a slim appearance characterized by a separate coin purse and a single sheet bill divider anchored at its ends between the sheets forming the bill folder. A modification of the invention includes a card case or pass case assembly comprising a foldable sheet anchored at one end and in the middle to the purse and bill holder respectively, with a clear plastic pass case anchored adjacent to the fold line so that the pass case is enclosed when the sheet is folded on itself.

---

Another modification includes a clear bill divider with a credit card case so that bills can be seen through the bill divider.

Heretofore combination billfolds and coin purses have been generally characterized by a thick tail extending freely from the coin purse to form the bill divider. This has resulted in a very bulky construction for the French purse and it is the principal object of the present invention to provide a combination billfold and purse of slim appearance having a separate single sheet bill divider.

Another important object of the present invention is to provide a slim, basic French purse construction wherein provision is made for the insertion of card cases or pass cases of thin flexible clear plastic construction.

These and other objects and advantages of the invention will become apparent hereinafter.

Summary of the invention

The present invention comprises a French purse construction having a separate coin pocket unit and an individual bill divider which results in a slim compact unit. The present invention further comprises the aforementioned French purse with a pass case included therein. The present invention further comprises the French purse and method of making same hereinafter described and claimed.

Description of the drawings

FIG. 1 is a plan view of the back cover of this unit;
FIG. 2 is a plan view of the silk wall;
FIG. 3 is a plan view of the upper pocket assembly;
FIG. 4 is a plan view of the outer flap;
FIG. 5 is a plan view of the coin pocket;
FIG. 6 is a sectional view taken along line 6—6 of FIG. 5.

Detailed description

Figure 8:
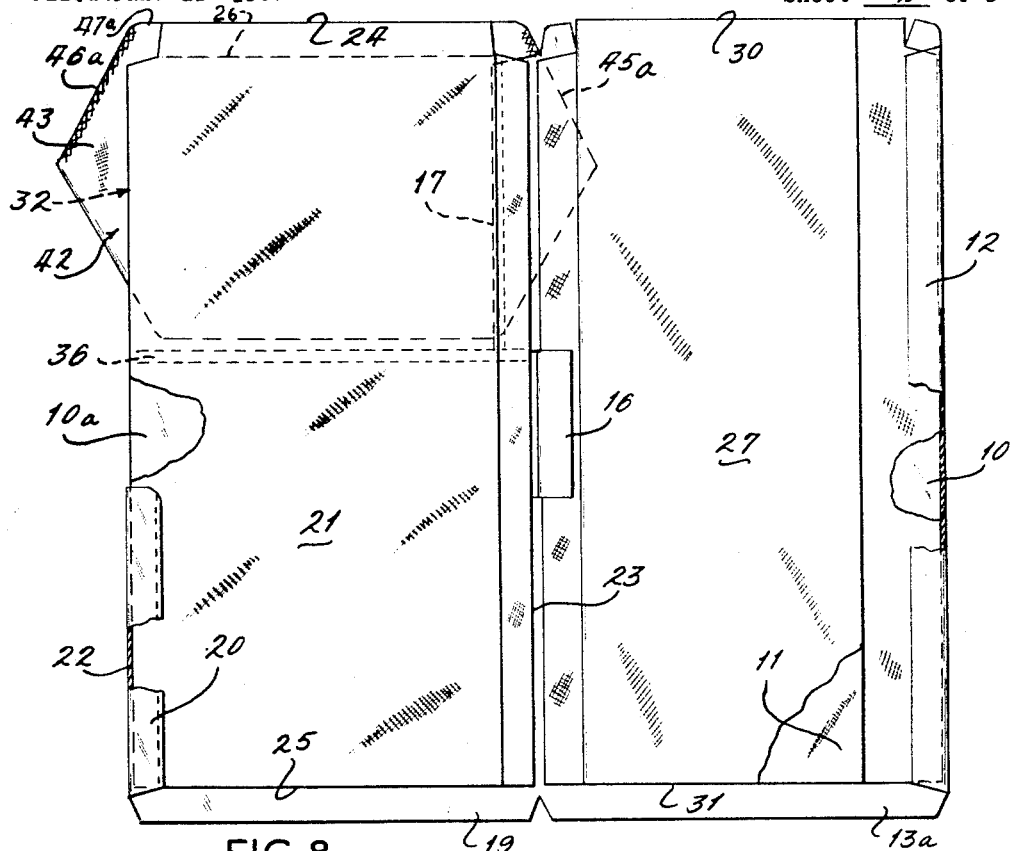
FIG. 8 is a plan view showing the basic assembly of the structure opened out.

FIG. 1 shows a back cover 10 having a silk lining 11 (indicated by broken lines in FIG. 1) attached to the inner surface thereof. The lining 11 is attached along one side edge by an inturned seam 12 and is stitched at an end margin 13. The opposite end margin of the back cover 10 is designated 13a. Positioned in the back cover 10 is the female part of an expansible snap fastener construction 14 which may be of the type described and claimed in U.S. Patent Nos. 3,292,225; 3,029,854 and 3,270,385. A side flap 10a is hinged to the back cover 10 along hinge line 15. The back cover 10 also includes a continuation of the hinge line 15 to define separate flaps 16 and 17. The side flap 10a includes end margins 18 and 19 and a foldable side margin 20. FIG. 2 shows a silk wall 21 which is a double piece of fabric and consists of side margins 22 and 23 and end margins 24 and 25. A stiffener 26 is enclosed adjacent to the margin 24.

29, and end margins 30 and 31.

FIG. 3 is an upper pocket assembly 32 which comprises side margins 33 and 34 and end margins 35 and 36.

FIG. 4 shows a flap member 37 comprising side margins 38 and 39 and end margins 40 and 41.

FIGS. 5 and 6 show a coin pocket unit 42 which consists of an outer cover 43 and an inner lining 44. The inner lining 44 is stitched to the outer cover 43 along diagonal margins 45 and 45a and 46 and 46a, but otherwise is positioned freely inside the outer member 43.

Figures 7, 9:
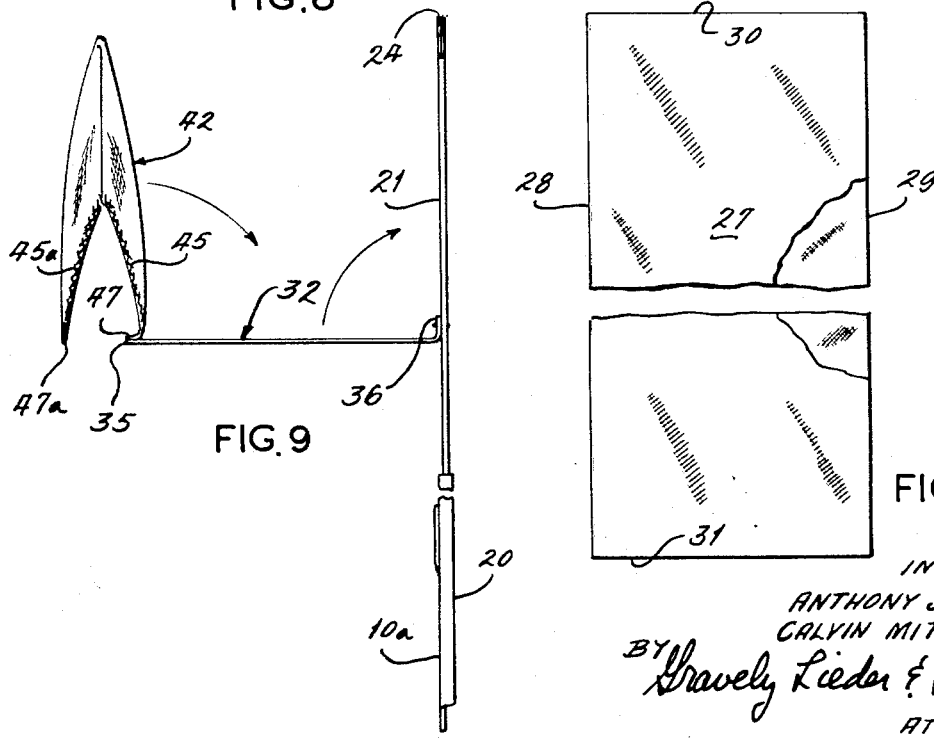
FIG. 7 is a plan view of the bill divider.
FIG. 9 is a side view of the structure shown in FIG. 8.

FIG. 7 shows the bill divider 27 which is a doubled piece of fabric material and includes side margins 28 and FIG. 8 shows the initial basic assembly of the unit with the bill folder panels opened outwardly.

The unit shown in FIGS. 8 and 9 comprises the outer cover 10 having the bill divider 27 attached to the silk lining 11 along at least one of the end margins 30 and 31 but otherwise being free inside the back cover 10. The silk wall 11 is fastened to the inner surface of back cover 10 along the side margin 12 and along the inturned flap portion 16.

A portion of the side margin 23 of the silk wall 21 is attached to the inner surface of the back cover flap 17 and the side margin 20 of the side flap 10a is turned over and sewn to a portion of the opposite silk wall side margin 22 to attach the silk wall 21 to the back cover 10.

The end margin 36 of the upper pocket assembly 32 is attached to the opposite side of the silk wall 21 at an intermediate location. An end margin 47 of the coin pocket 42 is attached to the opposite end margin 35 of the upper pocket assembly 32 so that when the upper pocket member 32 is folded toward the silk wall 21 it encloses the coin pocket 42 therebetween.

In the final assembly of the French purse (FIG. 10) the back cover end margin 13, the silk wall end margin 24, the bill divider end margin 30 and the margins 45a, 46a and 47a of the coin pocket 42 all are fastened together by one frame member 48 of the hinged frame which fits around the open end of the coin pocket 42.

The opposite hinged frame member 49 is crimped around the coin pocket end margins 45, 46 and 47, the end margin 24 of the upper pocket assembly 21 and the end margin 40 of the flap 37. This completes the coin pocket assembly.

The inner side of the flap 37 is provided with the male portion of the snap fastener assembly 14. The end margins 13a of the back cover 10 is turned over and fastened to the inside of the back cover 10 over the end margin 31 of the bill divider 27. This end margin 31 can be left free if desired.

The end margin 19 of the flap 10a is similarly turned over and fastened to attach the silk lining end margin 25. This closes the bottom of a pocket 50 defined between the inner surface of the flap 10a and the silk wall 21. To finish the assembly of the French purse, the inturned end margins 13a and 19 are sewn together.

Thus it is seen that the present invention provides a very simple and efficient type of assembly which achieves a slim, thin final construction.

*Modification having pass case*

Figure 10:
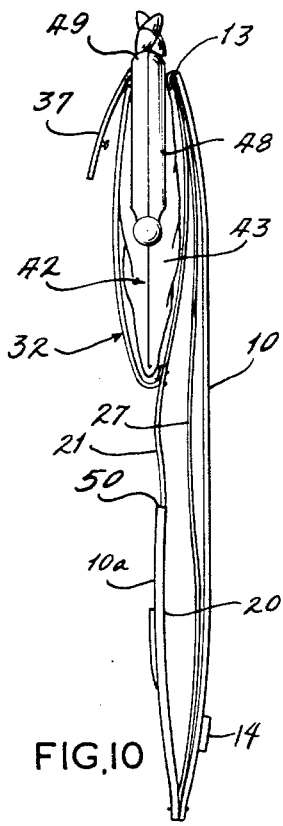
FIG. 10 is an end view of the assembled French purse.
Figure 11:
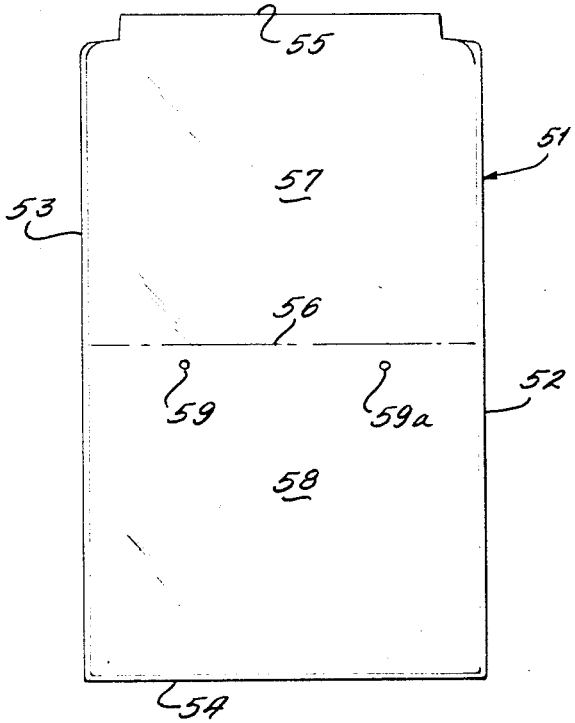
FIG. 11 is a plan view of the pass case assembly of a modification of the invention.
Figure 13:
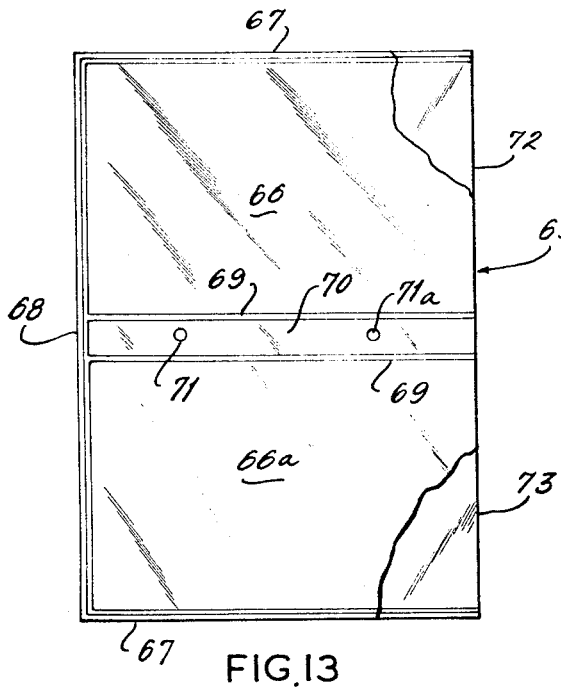
FIG. 13 is a plan view of a pass case used with the modification.
Figure 12:
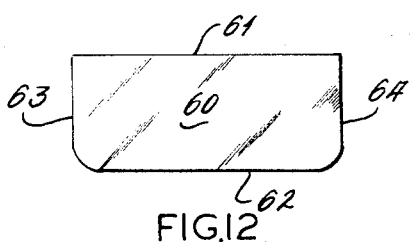
FIG. 12 is a plan view of a closure member for use with the modification.
Figure 14:
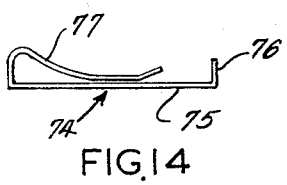
FIG. 14 is a side view of a pass case retainer bar.

The basic parts of the modification shown in FIGS. 10–17 are similar to the basic parts shown in FIGS. 1–9 except that the upper pocket assembly is replaced by the pass case assembly 51 of FIG. 11 which consists of the member having side margins 52 and 53 and end margins 54 and 55 and a transverse hinge line 56 dividing the member into an upper portion 57 and a lower portion 58. Two openings 59 and 59a are formed in the lower portion 58. In addition, a pass case closure member 60 having end margins 61 and 62 and side margins 63 and 64 as shown in FIG. 12 is used. Also, the pass case 65 of FIG. 13 which consists of pairs of transparent plastic side by side pockets 66 and 66a having closed outer side margins 67, a closed bottom margin 68 and spaced closed inner margins 69 which define a center section 70 having openings 71 and 71a formed therein is used. The upper end margins 72 and 73 are open to admit passes or other cards.

A pass case retainer 74 comprises a bottom section 75, an upturned free end section 76 connected thereto and a spring clip section 77 is used to hold the pass case 65 assembled to the French purse.

Figure 15:
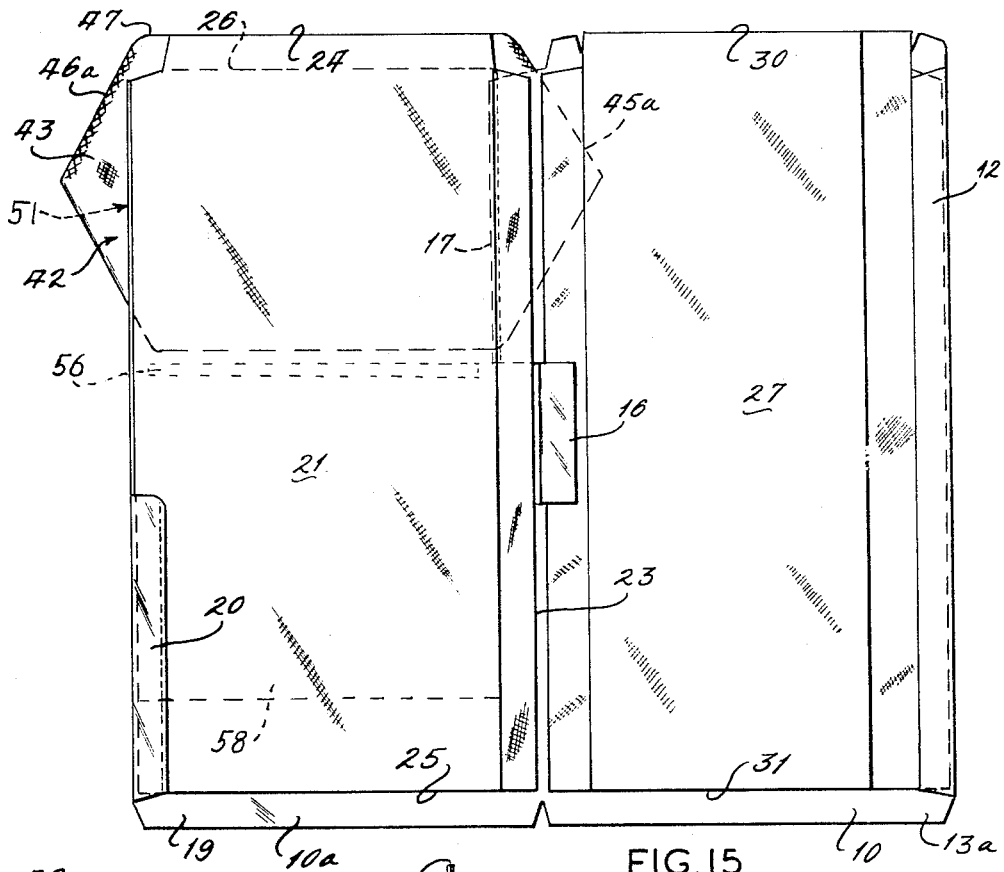
FIG. 15 is a plan view of the basic assembly of the modification opened out.
Figure 16:
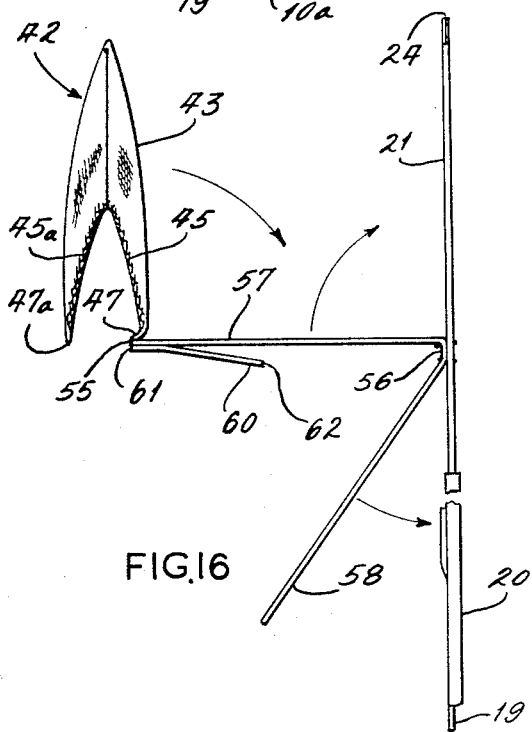
FIG. 16 is an end view of the assembly shown in FIG. 15.

The assembly of FIGS. 15 and 16 is similar to the assembly of FIGS. 8 and 9 except that the pass case assembly 51 is attached to the underside of the silk wall 21 along the fold line 56 so that the openings 59 and 59a are free in the depending portion 58.

The end margin 55 of the pass case assembly 51 is attached to the coin purse margin 47 so that the coin purse 42 is nestled between the back side of the portion 57 and the adjacent part of the silk wall 21 (FIG. 16).

Fastened to the front side of the portion 57 at the margin 55 is the pass case closure 60. The closure member margin 61 secured to the pass case assembly margin 55 and being of rigid clear plastic construction, retains the margin 54 in folded condition when the pass case is closed.

Figure 17:
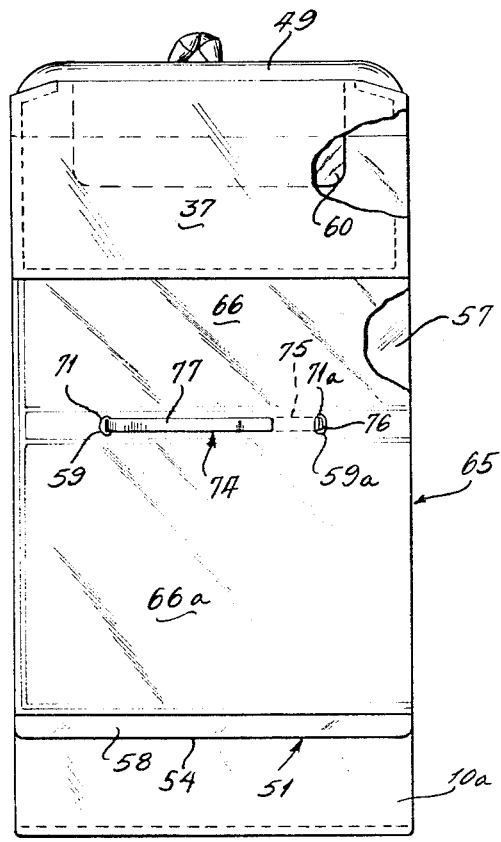
FIG. 17 is a plan view showing the completed modification of the invention opened.
Figure 18:
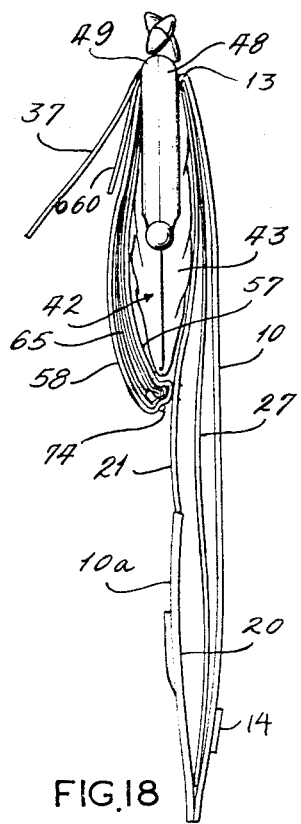
FIG. 18 is an end view of the structure shown in FIG. 17.

In forming the completed French purse of FIGS. 17 and 18, substantially the same construction is used as explained for FIG. 10. However, the coin purse frame member 49 is crimped around the coin purse margin 47, the pass case assembly margin 55, the closure margin 61 and the flap margin 40, with the closure member 60 being between the surface of the portion 57 and the inner surface of the flap 37.

Also, the pass case 65 is positioned inside the pass case assembly 51, so that the openings 71 and 71a are aligned with the openings 59 and 59a. The case portion 66 is adjacent to the flap portion 57 and the case portion 66a is adjacent to the flap portion 58. The pass case retainer 74 is positioned so that the leg 76 passes through the openings 59a and 71a and the bar 75 is beneath the pass case assembly portion 58. The spring clip 77 engages the openings 59 and 71 and urges the pass case center portion 69 against the assembly portion 58.

When the pass case assembly 51 is folded upwardly, the flap margin 54 is retained beneath the closure member 60.

Figure 19:
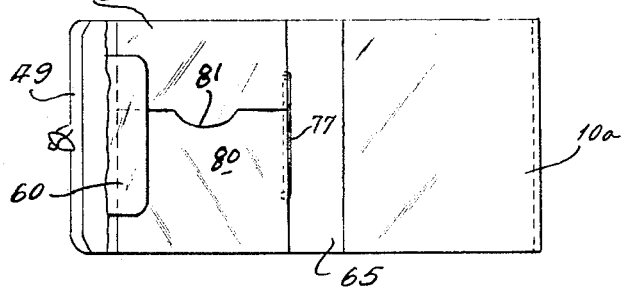
FIG. 19 is a fragmentary side view of a modification of the invention of FIGS. 11–18 having a credit card case incorporated therein.

FIG. 19 is similar to the structure of FIGS. 11–18 and includes a credit card case 80 attached to the underside of the free portion 58 of the pass case assembly 51. The top margin 81 of the credit card case 80 defines a pocket opening into which credit card may be positioned so as to be readily available to the user without opening the entire purse.

Figure 20:
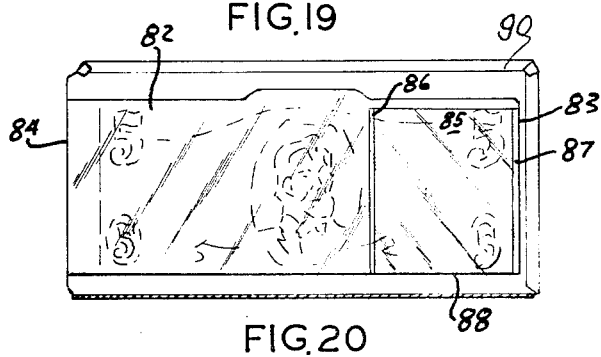
FIG. 20 is a fragmentary side view of one panel of a bill holder showing a plastic bill divider and a plastic credit card case incorporated therein.

FIG. 20 shows the inner surface of one panel 90 of a bill holder which has a transparent bill divider 82 positioned thereon. This allows the bills (indicated by broken lines) to be visible through the divider 82. The divider 82 is free at the side edge 83 and is secured at the side edge 84 to the panel 90. This construction is suitable for any type of bill holder device.

Another improvement shown in FIG. 20 is the provision of a credit card case 85 (also of transparent material) adjacent to the edge 83 of the bill divider 82. The case panel 85 is secured to the bill divider 82 at the sides 86 and 87 and the end 88 is open. The bill divider 82 and the credit card case 85 both preferably are of heat sealable plastic material.

Accordingly, the present invention provides a pass case assembly included in a French purse construction with the completed object being of thin configuration and achieving all of the objects and advantages sought therefor.

This invention is intended to cover all changes and modifications of the examples of the invention herein chosen for purposes of the disclosure, which do not constitute departures from the spirit and scope of the invention.

What is claimed is:
1. A French purse comprising
  (a) opposed inner and outer panels connected at their ends and having a substantially closed side and a substantially open side to define a bill compartment,
  (b) a thin independent bill divider positioned between the opposed panels and fastened in the bill compartment at at least one of its end margins,
  (c) a coin purse having an open end bordered by a hinged frame forming an opening to the coin pocket, said purse being outside the bill compartment and connected to the opposed panels at one of the end connections by one of the hinge frame members,
  (d) a cover panel hingedly fastened to the inner panel and foldable toward the coin purse,
  (e) a card case covered by the cover panel when it is folded toward the coin purse,
  (f) a retainer flap fastened at one margin to the other hinge member,
  (g) and expansible fastening means connecting the outer panel to the retainer flap when the inner and outer panels are folded about the coin purse to enclose the same.
2. The structure of claim 1 including means beneath the retainer flap for retaining the cover panel in folded relation.
3. The structure of claim 2 wherein said means is a relatively stiff transparent panel having a free margin overlaying the folded portion of the cover panel and a margin secured by the second hinge frame.
4. A French purse comprising
  (a) opposed inner and outer panels connected at their ends and having a substantially closed side and a substantially open side to define a bill compartment,
  (b) a thin independent bill divider positioned between the opposed panels and fastened in the bill compartment at at least one of its end margins,
  (c) a coin purse having opposed lips bordered by a hinged frame forming an opening to the coin pocket, said purse being outside the bill compartment and fastened at one lip to the opposed panels at one of the end connections,

(d) means connecting the other lip to the inner panel comprising a purse panel positioned beneath the retainer flap and having an end margin fastened to the frame and the other end margin folded beneath the purse panel and fastened to the outer surface of the inner panel to present a smooth outer seam, (e) a retainer flap fastened at one margin to said other lip, (f) and expansible fastening means connecting the outer panel to the retainer flap when the outer panels are folded about the coin purse to enclose the same, (g) the coin purse being a separate unit formed by two opposed sheets stitched at their edges and open around the said lips.

5. The construction of claim 4 including a side panel hinged to the outer panel along a portion of the closed side and folded over the inner panel and attached thereto along a side margin and an end margin to define a pocket open toward the center of the outer surface of the inner panel.

6. A French purse comprising (a) opposed inner and outer panels connected at their ends and having a substantially closed side and a substantially open side to define a bill compartment, (b) a thin independent bill divider positioned between the opposed panels and fastened in the bill compartment at at least one of its end margins, (c) a coin purse having opposed lips bordered by a hinged frame forming an opening to the coin pocket, said purse being outside the bill compartment and fastened at one lip to the opposed panels at one of the end connections, (d) means connecting the other lip to the inner panel comprising a double panel folded along a transverse fold parallel to the end margins, one end margin being fastened to the frame adjacent to the outer surface of the purse, means fastening the double panel to the outer surface of the inner panel adjacent to the fold line, the second end margin being below the frame when the double panel is in folded position, (e) a retainer flap fastened at one margin to said other lip, (f) and expansible fastening means connecting the outer panel to the retainer flap when the outer panels are folded about the coin purse to enclose the same.

7. The structure of claim 6 including a card case removably positioned between the folded over portions of the double panel and including means for retaining the double panel in folded position.

8. The construction of claim 6 including a side panel hinged to the outer panel along a portion of the closed side and folded over the inner panel and attached thereto along a side margin and an end margin to define a pocket open toward the center of the outer surface of the inner panel, said double panel being provided with openings in the free portion adjacent to the folding, a card case retainer positioned in said openings, a card case including a central portion having openings aligned with the panel opening and transparent pockets hingedly connected to the central portion, said pockets being open on one edge only, said retainer including an upright arm in one set of openings, a bar beneath the double panel and a spring clip in the second set of openings overlying and engaging the card case to urge the card case into engagement with the double panel, said construction including a closure panel between the closure flap and the trapped portion of the double panel, said closure panel having a free end overlying the folded over free portion of the double panel to enclose the pass case and retain the same in closed condition.

9. The structure of claim 6 including a credit card pocket secured to the reverse side of the free end of the double panel so that the said pocket is exposed when the double panel is in folded position.

10. The structure of claim 9 wherein the credit card pocket is a substantially half panel secured to the double panel at its bottom end and both sides leaving a free top margin for insertion of credit cards therein.

11. The structure of claim 6 including means beneath the flap for retaining the second margin in folded relation.

12. The structure of claim 11 wherein said means is a relatively stiff panel having a free margin overlaying the folded over portion of the double panel and a margin secured between the flap and the double panel.

13. The structure of claim 6 including a card case retainer positioned in openings in the free portion of the double panel adjacent to the line of attachment to the inner panel, and a card case positioned on the retainer adjacent to the double panel, said card case including a central portion having openings aligned with the panel openings to admit the retainer, and open transparent pockets hingedly connected to the central portion.

14. The structure of claim 13 wherein the retainer includes an upright arm in one set of openings, a bar beneath the double panel and a spring clip in the second set of openings overlying and engaging the card case to urge the card case into engagement with the double panel.

15. The structure of claim 13 including a closure panel between the retainer flap and the trapped portion of the double panel, said closure panel having a free end overlying the folded over free portion of the double panel to enclose the pass case and retain the same in closed condition.

References Cited

UNITED STATES PATENTS

| Re. 23,577 | 11/1952 | Knee | 150—35 |
|---|---|---|---|
| 1,680,687 | 8/1928 | L'Enfant | 150—38 |
| 2,439,731 | 4/1948 | Hawes | 150—38 |
| 2,674,290 | 4/1954 | St. Thomas | 150—39 |
| 2,710,037 | 6/1955 | Caldwell | 150—38 |
| 2,788,824 | 4/1957 | Browghton | 150—35 |
| 2,854,051 | 9/1958 | Lowe | 150—35 |

JOSEPH R. LECLAIR, *Primary Examiner.*

U.S. Cl. X.R.

150—38